United States Patent [19]
Schneider et al.

[11] Patent Number: 4,767,667
[45] Date of Patent: Aug. 30, 1988

[54] FURNITURE LAMINATE SHEET OR WEB

[75] Inventors: Manfred Schneider, Munich; Heinrich Heitz, Germering; Dieter Schlenz, Neufahrn; Egon Ewald, Munich, all of Fed. Rep. of Germany

[73] Assignee: Alkor GmbH Kunststoffe, Munich, Fed. Rep. of Germany

[21] Appl. No.: 899,037

[22] Filed: Aug. 22, 1986

[30] Foreign Application Priority Data

Aug. 24, 1985 [DE] Fed. Rep. of Germany ....... 3530290

[51] Int. Cl.$^4$ .............................................. B32B 15/00
[52] U.S. Cl. ................................. 428/336; 428/322.2; 428/323; 428/345; 428/511; 428/537.1; 428/500; 428/516
[58] Field of Search ............ 428/500, 516, 511, 537.1, 428/345, 322.2, 323; 525/240

[56] References Cited
U.S. PATENT DOCUMENTS 3,275,580 9/1966 Battista ................................. 428/326
4,423,117 12/1983 Machonis et al. ................... 428/500
4,567,089 1/1986 Hattori et al. ....................... 428/500
4,673,619 6/1987 Itaba et al. .

Primary Examiner—Edith Buffalow
Attorney, Agent, or Firm—Foley & Lardner, Schwartz, Jeffery, Schwaab, Mack, Blumenthal & Evans

[57] ABSTRACT

A multi-layer laminate web for furniture formed of a polyolefin web containing a mixture or blend of specific proportions by weight of a propylene homopolymer or copolymer and specific proportions by weight of a low pressure polyethylene, polyvinylalcohol, ethylene-vinylalcohol copolymer, ethylene-acrylic acid copolymer, ethylene-acrylate ester-acrylic acid copolymer or -terpolymer and/or polycaprolactone or a mixture or blend of low pressure polyethylene with one or more of the foregoing polymers, copolymers or terpolymers and specific proportions by weight of a finely divided mineral filler or mineral filler mixture having on the surface thereof a substance having polar and non-polar groups, and a surface layer having an average thickness from 3 to 30 microns applied over the polyolefin web. A method for producing a furniture laminate is also disclosed.

22 Claims, 1 Drawing Sheet

FURNITURE LAMINATE SHEET OR WEB

BACKGROUND OF THE INVENTION

The present invention relates to a laminate sheet or web for furniture comprising a polyolefin sheet or web containing a reactive compound or reactive groups and which contains finely divided filler or filler mixtures in the polyolefin sheet or web, as well as optional processing aids, colored pigments, and/or modifying agents.

Wood materials covered with polyolefin films and processes for their production are already known from published West German patent application No. DE-OS 33 02 599. However, the reactive compounds in the laminate web according to this patent application consist of organic fillers, for example cellulose, finely divided cellulose fibers and the like, so that the processing temperature may not be chosen very high in order that damage to these organic substances (for example the occurrence of undesired discolorations) will be avoided. Finally, it has been found that the print layer, which has been applied to film of this type as a surface layer in order to achieve a decorative effect, a wood-tone coloration or the like, has a low abrasion resistance and is easily damaged.

The task and purpose of the invention is therefore to avoid the foregoing disadvantages and to provide a polyolefin sheet or web for furniture with equal or improved characteristics and which particularly provides better processing characteristics and thus enables use of more favorable production conditions. The sheet or web must be adherent, printable and substantially avoid the danger of damage to the printed layer. The additive materials which are used should exhibit little or no temperature sensitivity at the usual processing temperatures of the polyolefin. For convenience in discussion, the term "web" will be used hereinafter to refer collectively to webs, sheets, films and the like.

SUMMARY OF THE INVENTION

It is the object of the invention to provide an improved laminate web for furniture.

It is also an object of the invention to provide a laminate web which is less sensitive to high processing temperatures.

Another object of the invention is to provide a laminate web which is strongly adherent to the underlying wood.

A further object of the invention is to provide a laminate web which has a printable surface with improved abrasion resistance.

A still further object of the invention is to provide a laminate web which exhibits improved processability and facilitates production under more favorable conditions.

These and other objects of the invention are achieved by providing a multi-layer laminate web for furniture comprising a polyolefin web comprising an admixture of from 70 to 97.5 parts by weight of a first polymer material selected from the group consisting of propylene homopolymers and propylene copolymers, and from 5 to 30 parts by weight of a second polymer material selected from the group consisting of low pressure polyethylene, polyvinylalcohol, ethylene-vinylalcohol copolymers, ethylene-acrylic acid copolymers, ethylene-acrylate ester-acrylic acid copolymers or -terpolymers, polycaprolactone, and mixtures and blends of low pressure polyethylene with at least one of the foregoing materials, and per 100 parts by weight of the first and second polymer material admixture, from 50 to 150 parts by weight of at least one finely divided mineral filler material, of which more than 60% includes a reactive material containing at least one polar group and at least one non-polar group, the reactive material being present in an amount from 0.5 to 10 weight percent based on the weight of the filler, and a surface layer having an average thickness from 3 to 30 microns disposed on top of the polyolefin web.

BRIEF DESCRIPTION OF THE DRAWINGS

The invention will be described in further detail with reference to the accompanying drawings wherein.

DETAILED DESCRIPTION OF PREFERRED EMBODIMENTS

Figure 1:
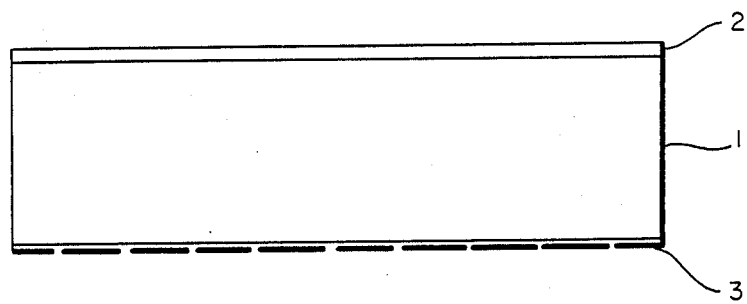
FIG. 1 is a schematic illustration of a first embodiment of the invention.

According to the invention there is produced a laminate web for furniture comprising a polyolefin web containing a reactive compound or reactive groups in which a finely divided filler or filler mixture is contained in the polyolefin web, optionally together with processing aids, colored pigments and/or modifying agents. In accordance with the invention, the furniture laminate web, which comprises at least two layers, and preferably more, is formed of a polyolefin web containing a mixture or blend of from 70 to 97.5 parts by weight, preferably 75 to 85 parts by weight, of a propylene homopolymer or copolymer and from 5 to 30 parts by weight, preferably from 15 to 25 parts by weight, of a material selected from the group consisting of low pressure polyethylene, polyvinylalcohol, ethylene-vinylalcohol copolymers, ethylene-acrylic acid copolymers, ethylene-acrylate ester-acrylic acid copolymers or -terpolymers (EAA), polycaprolactone, and mixtures or blends of low pressure polyethylene with one or more of the foregoing polymers, copolymers or terpolymers, and, for every 100 parts of the foregoing synthetic polymer mixture or blend, from 50 to 150 parts by weight, preferably from 70 to 120 parts by weight, of a finely divided mineral filler or filler mixture, preferably calcium carbonate, micronized talcum, kaolin and/or silicic acid gel. The term "ethylene-acrylic acid ester-acrylic acid copolymer" is intended to refer to an alloy or blend in which the copolymer is contained. Advantageously, more that 60 percent, preferably more than 75 percent, of the filler material (based on the total amount of filler material being 100 percent) is provided with a reactive material, wherein the reactive material is a material having at least one polar group and at least one non-polar group, in an amount by weight from 0.5 to 10 percent by weight, preferably from 1 to 5 percent by weight, (calculated with reference to 100 parts by weight of filler or filler mixture), and the reactive material is preferably distributed over all or part of the surface of the filler or filler mixture. The laminate web further comprises a surface layer or surface film having an average thickness of from 3 to 30 microns, preferably from 5 to 20 microns, which is disposed on or over the polyolefin web. The polyolefin web has a thickness of from 30 to 700 microns, preferably from 70 to 500 microns.

By use of the invention sheets or webs can be produced with a high surface tension and good printability as well as a sufficient storage life, during which the surface tension does not decrease or only decreases insubstantially.

The surface layer or surface film according to the invention preferably comprises a transparent or nearly transparent synthetic plastic material or a transparent synthetic polymer coating with a thickness of from 3 to 30 microns, preferably from 5 to 20 microns.

The average particle diameter of the filler material or filler material mixture amounts to from 0.05 to 30 microns, preferably from 0.8 to 10 microns.

In accordance with a preferred embodiment of the invention, on the underside of the polyolefin web there is an adhesive layer or adhesion promoting layer or a layer containing one or more components of an adhesive having an average thickness of from 1 to 35 microns, preferably from 2 to 5 microns. Preferably adhesion promoting polyurethane resins or additions of isocyanates and/or binders, preferably water-soluble binders with a hardener component for the thermosetting adhesive, for example an organic acid in combination with a water-soluble acrylate resin, are used.

As hardener components, the known hardeners for the particular thermosetting synthetic polymers, such as sulfonic acids (e.g., paratoluene sulfonic acid), amines and the like, are used.

The laminate web according to the invention exhibits of its surface a surface tension of more than 68 dynes/cm, preferably more than 71 dynes/cm, and/or is corona treated or pretreated by a plasma process, whereby the surface tension is adjusted to the aforementioned values.

According to a preferred embodiment from 0.1 to 20 parts by weight, preferably from 1 to 10 parts by weight, of the filler material or filler material mixture provided with a polar substance may comprise or be replaced by an equal amount by weight of a polar filler material or polar filler material mixture, preferably uncoated kaolin and/or silica gel. Higher surface tension values can be achieved thereby, depending on the polar filler material which is used.

The transparent surface layer preferably comprises a transparent or nearly transparent lacquer layer or lacquer overcoating layer.

According to a preferred embodiment, a print layer is arranged between the surface layer or surface film and the polyolefin substrate web.

As the polar substance or substances, at least one organic compound with at least one OH group and/or COOH group and/or SiOR or SiOR groups or similar polysiloxane groups and at least one or more non-polar groups are contained on the surface of the mineral filler material. Alternatively, the mineral filler material is completely or partially coated with a thin layer of the polar material. The polar groups are preferably oriented thereby toward the filler material.

Saturated and unsaturated carboxylic acids with a carbon number of more than 3, preferably more than 10, hydroxycarboxylic acids, polyoxycarboxylic acids with a carbon number of more than 6, preferably more than 10, particularly stearic acid, hydroxy stearic acid, and polysiloxanes (for example polydimethyl-siloxane) or hydroxy group or amino group containing polysiloxanes or polysiloxanes containing one or more hydroxy groups, are preferably used as compounds containing polar and non-polar groups.

It is important that the compounds containing polar and non-polar groups are not added separately during manufacture of the sheets or webs, but instead are added with the filler or filler mixture, whereby they must be disposed on the surface or a part of the surface of the filler material. If the compounds containing polar and non-polar groups are added separately during the production of the sheets or webs, i.e., without previously having been disposed on the surface of the filler material, then there is a danger that processing difficulties will arise or that sheets or webs of inferior quality will be produced.

The thermoplastic web may be bonded to the wood or wood material either cold or hot, but preferably hot. Adhesive bonding is effected with the help of a thermosetting or a thermoplastic adhesive. Formaldehyde condensation resins formed of urea, melamine and phenol are preferably used thereby. These condensation resins exhibit outstanding properties as adhesives since they are heat-resistant, hard and highly reactive. It has now been found that this type of resin is particularly suitable for laminating thermoplastic sheets or webs to wood materials since they improve the surface hardness, the heat resistance, the surface smoothness and the water resistance of the resulting laminate.

The thermosetting adhesive layer is applied in a thickness of from 0.01 to 0.1 mm, preferably from 0.03 to 0.05 mm. By way of example, desirable results may be obtained by using adhesives which have a ball pressure hardness according to German Industrial Standard (DIN) 53456 of 2000 to 4000 kp/cm$^2$. The quantity of thermosetting adhesive applied amounts to from 10 to 150 g/m$^2$, preferably from 30 to 80 g/m$^2$.

In one embodiment the polar groups may be free hydroxy groups and/or N-methylol groups (=N—CH$_2$—OH groups) and/or =N—CH$_2$—OR groups or COOH groups or COOR groups, wherein R represents alkali metal or alkaline earth metal or an alkyl residue.

As polyolefins within the scope of the invention, preferably all types of olefin homopolymers, copolymers and terpolymers may be used, such as polyethylene, including high density polyethylene (HDPE), low density polyethylene (LPDE), polypropylene, polybutene-1, mixed polymers and blends of ethylene and propylene as well as copolymers of ethylene and propylene, which exhibit a heat resistance VSP A above 100° C., as well as mixtures of these materials. Among the copolymers, those with vinyl compounds are of most interest. In using polyethylene and ethylene copolymers, preferably those having a melting point of greater than 110° C. are used, and in using propylene homopolymers and copolymers, preferably those with a melting point of greater than 130° C. are used.

According to another embodiment the web can additionally contain one or more organic modifying agents. These serve to regulate the drawability, calendarability, extrudability and similar characteristics. A preferred group for this purpose are block copolymers of styrene with butadiene or isobutylene or isoprene. Other suitable modifying agents are polymers based on styrene-butadiene or methacrylate-butadiene-styrene. Polyolefins which contain functional groups are particularly suitable for influencing the relationships of physical properties to adherability. Modifier additions of this type are advantageously present in an amount of from 0.5 to 20 parts by weight, preferably from 2 to 10 parts by weight.

Monolayer films or composites or multilayer films, for example coextruded films, can be used as sheets or webs according to the invention. The indicated maximum sheet thickness is normally not exceeded for economic reasons, however, thicker sheets may also be used. The sheets which are used may be used printed or unprinted, provided with an exemplary wood grain appearance, or as translucent or transparent sheets or colored sheets.

As previously mentioned, the advantages of the sheets or webs according to the invention show greater effect when the sheets or webs are subjected to a treatment which improves the surface adhesion. This surface treatment preferably takes the form of an activation by radiation. Among radiation methods, corona treatment is preferred. However, other radiation methods can also be used. Examples of other suitable radiation methods include electron radiation, ultraviolet (UV) radiation, and/or laser irradiation. Suitable devices for effecting such treatments are known to persons skilled in the art. The activating surface treatment can be carried out on the web of the invention at any desired time during or after the production of the web.

As the thermosetting adhesive an adhesive comprised of two or more components advantageously is used, which preferably is a condensation resin based on an amine-formaldehyde resin, an amino-formaldehyde resin or a phenol-formaldehyde resin. As a thermosetting adhesive based on a formaldehyde condensation resin, preferably melamine-formaldehyde, urea-formaldehyde or phenol-formaldehyde resins are used. In one advantageous embodiment, at least one component of the thermosetting adhesive is a water-soluble hardener. The hardener and the other components which react to form the adhesive are, according to a preferred embodiment, each applied separately to the synthetic polymer web or to the wood material (so that the components are each separately disposed on different substrates), and subsequently the synthetic polymer web is united with the wood material under pressure. The hardener is thereby preferably applied with a binding agent to the back side of the web as a rear layer or backside coating.

In the accompanying drawings (FIG. 1 and FIG. 2), embodiments of the furniture laminate web of the invention are illustrated schematically. FIG. 1 shows a surface layer or surface film 2 arranged on a polyolefin web 1, while underneath the web 1 an adhesive layer or adhesion promoting layer 3, preferably a component of the thermosetting adhesive in combination with a binding agent, is arranged as a back layer or rear surface coating.

Figure 2:
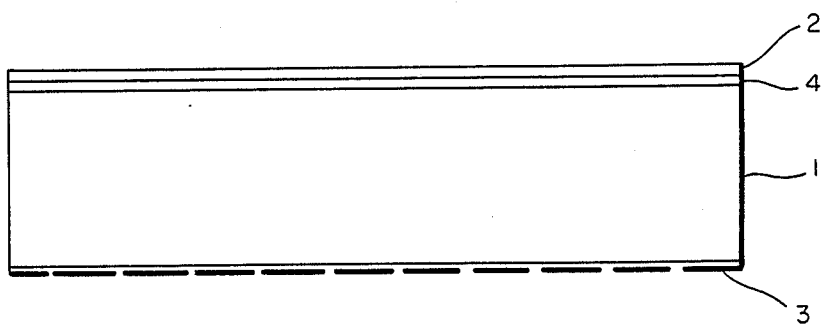
FIG. 2 is a schematic illustration of an alternate embodiment of the invention.

In FIG. 2 a print layer 4 is arranged partially or completely over the surface of the polyolefin web, and the print layer is in turn completely covered by a surface layer 2.

The invention will be explained in further detail with reference to the following examples, which are set forth only to illustrate the invention and are not intended to limit its scope. Unless otherwise indicated, all references to parts refer to parts by weight.

Examples of Polyolefin Webs

EXAMPLE 1

80 parts propylene homopolymer
15 parts low pressure polyethylene (HDPE)
5 parts ethylene-vinylalcohol copolymer (EVAL)
99.5 parts calcium carbonate
0.5 parts hydroxystearic acid applied to the surface of the calcium carbonate
0.5 parts lubricants and stabilizers

EXAMPLE 2

80 parts propylene homopolymer
15 parts low pressure polyethylene (HDPE)
5 parts polyvinylalcohol (PVAL)
99.5 parts kaolin
0.5 parts polydimethylsiloxane applied to the surface of the kaolin
0.5 parts lubricants and stabilizers

EXAMPLE 3

80 parts propylene homopolymer
15 parts low pressure polyethylene (HDPE)
5 parts copolymer of ethylene and acrylic acid (EAA)
79.5 parts calcium carbonate
15 parts talcum
0.5 parts stearic acid applied to the surface of the filler mixture of calcium carbonate and talcum
5 parts silica gel
0.5 parts lubricants and stabilizers

EXAMPLE 4

90 parts propylene homopolymer
5 parts low pressure polyethylene (HDPE)
5 parts ethylene-vinylalcohol copolymer (EVAL)
49.5 parts calcium carbonate
45 parts kaolin
0.25 parts stearic acid
0.25 parts polydimethylsiloxane applied to the surface of the calcium carbonate and kaolin filler mixture
5 parts silica gel
0.5 parts lubricants and stabilizers The surface layer comprised a polyurethane resin lacquer having an average thickness of 10 microns.

The foregoing description and examples have been set forth merely to illustrate the invention and are not intended to be limiting. Since modifications of the disclosed embodiments may occur to persons skilled in the art which still incorporate the spirit and substance of the invention, the scope of the invention should be limited solely with respect to the appended claims and equivalents.

What is claimed is:

1. A multi-layer laminate web for furniture comprising:
a polyolefin web comprising an admixture of from 70 to 97.5 parts by weight of a first polymer material selected from the group consisting of propylene homopolymers and propylene copolymers, and from 5 to 30 parts by weight of a second polymer material selected from the group consisting of low pressure polyethylene, polyvinylalcohol, ethylene-vinylalcohol copolymers, ethylene-acrylic acid copolymers, ethylene-acrylate ester-acrylic acid copolymers and terpolymers, polycaprolactone, and mixtures and blends of low pressure polyethylene with at least one of the foregoing materials, and per 100 parts by weight of said first and second polymer material admixture, from 50 to 150 parts by weight of at least one finely divided mineral filler material, of which more than 60% includes a reactive material containing at least one polar group and at least one non-polar group, said reactive material being present in an amount from 0.5 to 10 weight percent based on the weight of the filler, and a surface layer of a transparent or nearly transparent synthetic plastic material or a transparent synthetic polymer coating having an average thickness from 3 to 30 microns disposed on top of said polyolefin web.

2. A multi-layer laminate web according to claim 1, wherein said polyolefin web comprises an admixture of from 75 to 85 parts by weight of said first polymer material and from 15 to 25 parts by weight of said second polymer material, and per 100 parts by weight of said first and second polymer material admixture from 70 to 120 parts by weight of finely divided mineral filler material, of which more than 75% includes said reactive material, and wherein said reactive material is present in an amount from 1 to 5 weight percent based on the weight of the filler.

3. A multi-layer laminate web according to claim 1, wherein said polyolefin web further comprises at least one material selected from the group consisting of processing aids, colored pigments, and modifying agents.

4. A multi-layer laminate web according to claim 1, wherein said finely divided mineral filler is selected from the group consisting of calcium carbonate, micronized talcum, kaolin and silica gel.

5. A multi-layer laminate web according to claim 1, wherein said surface layer has an average thickness from 5 to 20 microns.

6. A multi-layer laminate web according to claim 1, wherein said reactive material is applied over a portion of the surface of said finely divided filler material.

7. A multi-layer laminate web according to claim 1, wherein said reactive material is applied over the entire surface of said finely divided filler material.

8. A multi-layer laminate web according to claim 1, wherein said filler material has an average particle diameter from 0.05 to 30 microns.

9. A multi-layer laminate web according to claim 8, wherein said filler material has an average particle diameter from 0.8 to 10 microns.

10. A multi-layer laminate web according to claim 1, wherein said laminate web further comprises a layer on the underside of said polyolefin web having an average thickness from 1 to 35 microns and selected from the group consisting of adhesive layers, adhesion promoting layers and layers containing at least one component of an adhesive.

11. A multi-layer laminate web according to claim 10, wherein said layer on the underside of said polyolefin web has an average thickness from 2 to 5 microns.

12. A multi-layer laminate web according to claim 1, having on its surface a surface tension of at least 68 dyne/cm.

13. A multi-layer laminate web according to claim 12, having on its surface a surface tension of at least 71 dyne/cm.

14. A multi-layer laminate web according to claim 1, wherein the surface of the web is corona treated.

15. A multi-layer laminate web according to claim 1, wherein the surface of the web has been treated by a plasma treatment.

16. A multi-layer laminate web according to claim 1, wherein from 0.1 to 20 weight percent of said filler comprises a polar filler material.

17. A multi-layer laminate web according to claim 16, wherein said polar filler material is selected from the group consisting of uncoated kaolin and silica gel.

18. A multi-layer laminate web according to claim 6, wherein from 1 to 10 weight percent of said filler comprises a polar filler material.

19. A multi-layer laminate web according to claim 1, wherein said surface layer is selected from the group consisting of lacquer layers and lacquer overcoat layers which are at least substantially transparent.

20. A multi-layer laminate web according to claim 1, further comprising a print layer interposed between said polyolefin web and said surface layer.

21. A multi-layer laminate web according to claim 1, wherein said reactive material included in said filler material comprises at least one organic compound having at least one functional group selected from the group consisting of COOH groups and OH groups and at least one non-polar group disposed on the surface of the filler material.

22. A multi-layer laminate web according to claim 21, wherein said organic compound is oriented on the surface of the filler material with the polar group of the compound toward the filler material.

* * * * *